US005863367A

United States Patent [19]

Behnke et al.

[11] Patent Number: 5,863,367

[45] Date of Patent: Jan. 26, 1999

[54] METHOD OF MAKING A PRINTING BLANKET WITH A CONVEX COMPRESSIBLE LAYER

[75] Inventors: Richard L. Behnke, Inman; Vernon O'Neil Bridges, Spartanburg; W. Toriran Flint, Pauline; Joseph L. Byers, Inman, all of S.C.

[73] Assignee: Reeves Brothers, Inc., Spartanburg, N.C.

[21] Appl. No.: 334,770

[22] Filed: Nov. 4, 1994

Related U.S. Application Data

[62] Division of Ser. No. 203,549, Mar. 1, 1994, Pat. No. 5,522,315.

[51] Int. Cl.[6] .............................. B41F 13/08; B32B 5/26

[52] U.S. Cl. .......................... 156/154; 156/172; 156/192; 156/277; 156/300; 428/161; 428/909

[58] Field of Search .................................. 156/154, 277, 156/299, 300, 172, 192; 428/161, 909

[56] References Cited

U.S. PATENT DOCUMENTS

| | | | |
|---|---|---|---|
| 1,999,733 | 4/1935 | Luehrs | 428/909 |
| 3,152,387 | 10/1964 | MacLeod | 29/130 |
| 3,795,568 | 3/1974 | Rhodarmer et al. | 161/87 |
| 3,962,394 | 6/1976 | Hall | 264/90 |
| 4,015,046 | 3/1977 | Pinkston et al. | 428/422 |
| 4,042,743 | 8/1977 | Larson et al. | 428/306 |
| 4,042,804 | 8/1977 | Moser | 219/216 |
| 4,422,895 | 12/1983 | Shimura et al. | 156/633 |
| 4,554,040 | 11/1985 | van der Velden | 156/215 |
| 4,681,035 | 7/1987 | Kobler et al. | 101/217 |
| 4,913,048 | 4/1990 | Tittgemeyer | 101/141 |
| 5,069,958 | 12/1991 | Burns, Jr. | 428/246 |
| 5,205,213 | 4/1993 | Bresson | 101/217 |
| 5,304,267 | 4/1994 | Vrotacoe et al. | 156/86 |
| 5,316,798 | 5/1994 | Tittgemeyer | 427/409 |
| 5,323,702 | 6/1994 | Vrotacoe et al. | 101/217 |
| 5,352,507 | 10/1994 | Bresson et al. | 428/245 |
| 5,440,981 | 8/1995 | Vrotocoe et al. | 101/217 |

*Primary Examiner*—Michael W. Ball
*Assistant Examiner*—Sam Chuan Yao
*Attorney, Agent, or Firm*—Pennie & Edmonds

[57] ABSTRACT

A method of forming a cylindrical printing article having a unitary compressible laminate and which includes a rotatable support in the form of a cylinder. This method comprises forming a compressible laminate having upper and lower surfaces and a substantially uniform thickness from at least a printing face which forms the upper surface and a compressible layer positioned beneath the printing face. The compressible layer contains a plurality of compressible cells dispersed therein and has first and second surfaces, with the first surface bonded to an adjacent surface of the printing face. In another step, the first surface of the compressible layer is formed with a profile having a raised central portion so that the compressible layer is spaced closer to the upper surface of the printing face in the center of the laminate than at the ends. Preferably, this laminate is cylindrical and is in the form of a printing blanket or printing roller.

16 Claims, 3 Drawing Sheets

METHOD OF MAKING A PRINTING BLANKET WITH A CONVEX COMPRESSIBLE LAYER

This application is a division of Ser. No. 08/203,549, filed Mar. 1, 1994, now U.S. Pat. No. 5,522,315

FIELD OF THE INVENTION

This invention relates to elastomeric articles for use in lithographic printing applications, and in particular to compressible cylindrical printing blankets or rollers for use in offset printing presses.

BACKGROUND OF THE INVENTION

In the process of offset lithographic printing, a rotary cylinder is covered with a cylindrical surface referred to as a "printing plate" which has a positive image area that is receptive to oil-based inks and repellent to water as well as a background area that is repellent to the oil-based inks. The printing plate is rotated so that its surface contacts a second cylinder that is covered with a laminate having an ink-receptive rubber surface which is referred to as a "printing blanket". The ink present on the image surface of the printing plate transfers, or "offsets", to the surface of the printing blanket. Paper or other sheet stock to be printed is then passed between a nip formed by the blanket-covered cylinder and a rigid back-up cylinder or another blanket covered cylinder to transfer the image from the surface of the blanket to the paper. During the steps in which the image is transferred from the printing plate to the printing blanket and subsequently from the blanket to the paper, it is important to ensure intimate contact between the two contacting surfaces. This is ordinarily achieved by positioning the blanket-covered cylinder and the supporting cylinder or another blanket-covered cylinder that it contacts so that there is a fixed interference between the two. Therefore, the rubber-surfaced printing blanket laminate is generally compressed throughout the printing run to a fixed depth, typically about 0.002 to 0.006 inches.

If the printing blanket were constructed of solid rubber, it would bulge, or project radially away from the cylinder axis, in the areas adjacent to the nip when subjected to high nip pressure. This is because solid rubber cannot be reduced in volume and is therefore subject to lateral flow. Bulging would, of course, tend to distort the print image as well as possibly wrinkle the paper being printed. Therefore, compressible printing blankets have been developed.

To make the blanket compressible, a portion of the solid material making up the blanket is replaced by a gas, generally air. More specifically, layers beneath the surface of the blanket are constructed so as to contain millions of minute voids, which allow uniform compression to take place. As the voids beneath the area under pressure reduce in volume, they permit vertical compression—rather than lateral bulging—to take place at the cylinder nip. Conventional offset printing blankets generally include a multi-ply fabric base and a vulcanized elastomeric face. The threads of the fabric entrain a certain amount of air and provide voids and hence a certain amount of compressibility. To enhance the compressibility of such blankets, however, one or more cellular compressible layers is generally buried within or attached to one of the layers or fabrics between the base and the elastomeric face of the blanket.

Those skilled in the art have explored a wide variety of ways in which different open cell structures, closed cell structures, microspheres, and various combinations thereof can be used to obtain compressible layers that provide printing blankets having the desired compressibility properties. The numerous teachings of how to make compressible printing blankets include the teachings of Flint et al., U.S. Pat. No. 5,364,683; Larson U.S. Pat. No. 4,042,743; Shimura, U.S. Pat. No. 4,442,895; Rhodarmer et al., U.S. Pat. No. 3,795,568; Pinkston et al., U.S. Pat. No. 4,015,046; and Burns, U.S. Pat. No. 5,069,958.

In order to assure uniformity of printing, it is also important that compression be maintained uniformly over the entire length of the nip between the printing blanket and the support roll. Another important consideration relates to the handling of the paper or other webs being printed. Generally, cylindrical printing blankets used in various printing processes, are concaved on their outer surface to provide tension profiles across the width and between nips or contact points. Such tension profiles act to spread the web and prevent inward wrinkling.

FIG. 1 shows a structure representative of a concave-surfaced prior art cylindrical printing blanket. Printing blanket 1 is constructed around a metal support 2, typically configured in the form of a cylinder. A compressible layer 7 is thereafter formed by wrapping the coated support with a thread coated with an admixture comprising an elastomeric matrix 5 and a plurality of compressible cells 6. The wrapping conditions are controlled in such a manner that threads 4 sink to the lower portion of layer 7, adjacent to the coated support, whereas the remaining, i.e., upper, portion of layer 7 is comprised solely of the elastomer/cell admixture, substantially without any threads. After layer 7 is formed, it is partially dried or cured and a second fiber layer, i.e., of reinforcing fibers 8 coated with an elastomeric matrix 9 substantially free of cells 6, is applied upon compressible layer 7. Threads 4 and 8 act to reinforce the blanket in the same manner as layers of fabric would in non-cylindrical blankets. Matrix 9 acts as a subface for the printing surface 10. Subsequently, printing surface 10, for instance a solid elastomer such as a nitrile blend, is applied to the upper surface of blanket 1.

The degree of concavity of printing surface 9 as shown in FIG. 1 is exaggerated for illustrative purposes. However, it is manifest that a printing blanket or other roll surface that is concaved across its width varies in circumference around its cross-section, and that a point at either edge of the roll will travel further during a rotation of the roll than will a point at the center of the roll. Although this concavity solves the problem of paper wrinkling which is often encountered in the printing art, it leads, on the other hand, to the formation of unequal printing pressures and nip areas across the width of the blanket which, in turn, can cause undesirable results during printing, such as substantial dot gain and decreased print contrast values. In addition, it has a negative impact on the web feed tendencies.

Thus it would be desirable to have a printing blanket or similar compressible roll product that exhibits a uniform thickness across its entire width yet which enables the provision of tension profiles across the width and between nips or contact points in order to spread the web and prevent inward wrinkling.

SUMMARY OF THE INVENTION

The present invention relates to a printing article comprising a rotatable metal support in the form of a cylinder and a compressible laminate mounted upon the support. The compressible laminate has upper and lower surfaces and a substantially uniform thickness and comprises a printing face which forms the upper surface and a compressible layer positioned beneath the printing face. The upper surface of the compressible layer is spaced closer to the upper surface of the printing face in the center of the cylindrical support than at the ends to achieve improvements in printing performance.

In this article, the upper surface of the compressible layer may have a number of profiles, including a parabolic profile, a central step, optionally including tapered sides, a plurality of graduated steps, a diamond-shape, or a center portion which is flat and end portions which radially taper toward the ends of the laminate. Advantageously, the support is a shaft and the compressible laminate forms a roller on the shaft or the support is a printing cylinder and the compressible laminate comprises a cylindrical printing blanket. As is well known in the prior art, such printing cylinders may comprise a rotatable axis surrounded by means such as a cylindrical sleeve for supporting the cylindrical blanket (see, e.g., Vrotacoe et al. U.S. Pat. Nos. 5,304,267 and 5,323,702).

The invention also relates to the printing blanket itself. Such blankets generally include a number of additional layers or plys, such as at least one fabric or cord ply beneath the compressible layer or between the compressible layer and the elastomeric printing face. A subface formed from a high durometer, high tensile, low elongation elastomeric compound may be located beneath the printing face. Also, it is desirable for the printing face to have a surface profile with a roughness average of above about 0.6 and below about 0.95 microns.

The compressible layer generally includes cells formed from microspheres having a diameter of between about 1 and 200 microns or from gas bubbles trapped within a binder material. A protective coating of a material such as a fluorocarbon or a silicone can be provided on the fabric ply to prevent absorption and wicking of fluids therethrough, and the fabric ply can be a compressible fabric ply, if desired.

The invention also relates to a method of forming a compressible laminate by forming a compressible laminate having upper and lower surfaces and a substantially uniform thickness from at least a printing face which forms the upper surface and a compressible layer positioned beneath the printing face; and forming the upper surface of the compressible layer to have a profile with a raised central portion so that it is spaced closer to the upper surface of the printing face in the center of the laminate than at the ends.

This method may be carried out in a number of ways. Simply, it includes applying a substantially uniform thickness of the compressible layer and grinding the compressible layer to the desired profile. Alternatively, the method includes applying the compressible layer in the form of threads which carry a matrix of compressible material, and varying the amount of matrix material carried by the threads to increase the deposition of the matrix material toward the center of the laminate. The compressible layer may also be applied in the form of threads and a matrix of compressible material, and the drying rate of the matrix material may be varied across the width of the laminate prior to winding of the threads to thus allow for decreasing penetration of the threads into the matrix material toward the center of the laminate. In addition, the compressible layer may be applied in the form of a matrix of compressible material, and thereafter threads may be wound across the width of the laminate while varying the tension to thus allow for decreasing penetration of the threads into the matrix material toward the center of the laminate.

Another method for forming a compressible layer with a profiled upper surface within the laminate comprises wrapping the support with threads coated with an elastomeric matrix material admixed together with a plurality of compressible cells. During the winding, the thread sinks to the bottom of the elastomeric layer, above the uppermost fabric ply or support as the case may be, to form a base portion of the compressible layer. Above this base portion there is only the cell-containing elastomeric material, i.e., without any threads. The compressible layer is then at least partially dried or cured by a process known as "pre-curing". Thereafter, the layer is wrapped with one or more reinforcing threads coated with elastomeric matrix material only, i.e., without any cells. The threads forming this second, i.e, reinforcing, winding can remain atop the upper surface of the compressible layer due to the effect of the cure. Alternatively, the coated reinforcing threads may be allowed to penetrate the compressible layer to predetermined levels by, e.g., variably decreasing the percent of full cure or altering the thread tension.

Furthermore, the compressible layer may be applied in the form of a matrix of compressible material, and thereafter the pressure on the compressible layer during pre-curing of the matrix material is varied to allow for decreasing density of the compressible layer toward the center of the laminate. Similarly, the compressible layer may be applied in the form of threads which carry a matrix of compressible material, and the speed of the cylinder during the winding of the threads may be varied to increase the deposition of the matrix material toward the center of the laminate.

These methods can be used to apply the compressible laminate in the form of a cylinder, either as a printing blanket or a printing roller.

DETAILED DESCRIPTION OF THE INVENTION

Figure 1:
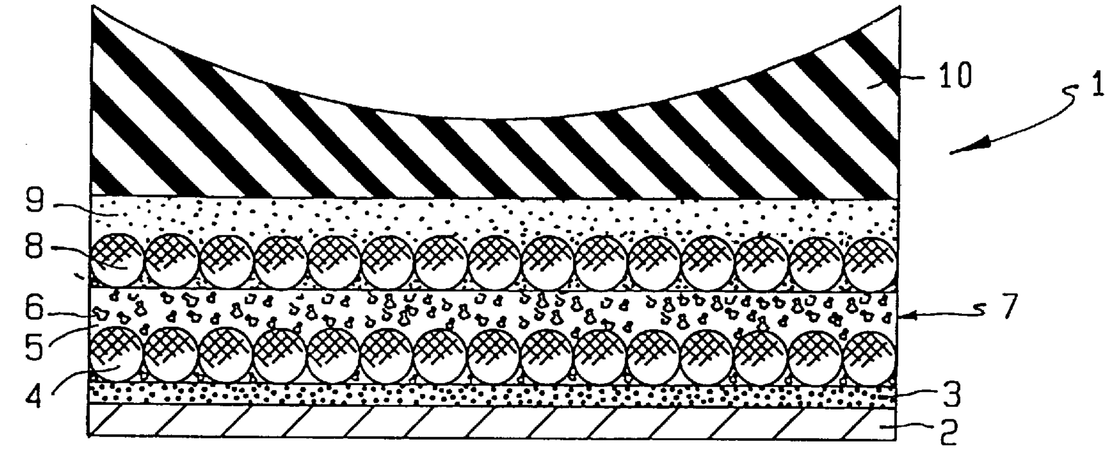
FIG. 1 Prior Art
FIG. 1 is an enlarged sectional view through a laminated compressible printing blanket that is representative of cylindrical prior art blankets.

In its broadest aspect, the present invention contemplates a compressible elastomeric article for use with or as a cylindrical roll assembly. The article has an external surface which is of substantially uniform circumference across its width, and includes a compressible layer that has a thickness or profile which is greater in the center of the article than it is toward the ends. The compressible layer is generally embodied in articles which are generally known and referred to as printing blankets or printing rollers.

A printing blanket is generally comprised of several layers which are laminated into a single unitary structure. A description of the various layers which may be used in the present invention are described in Flint et al., U.S. Pat. No. 5,364,683, the content of which is expressly incorporated herein by reference thereto.

Those skilled in the art are well aware of how to make a wide variety of compressible layers, as evidenced by the teachings of Flint et al., as well as Larson, Shimura, Rhodarmer et al., Pinkston et al., and Burns, which are referred to above. The latter five patents are also expressly incorporated herein by reference to the extent necessary to understand the variations of how the compressible layer can be formed.

A wide variety of printing blankets are known in general to those skilled in the art. In accordance with the present invention, though, the printing blankets are constructed to have a substantially uniform thickness across their widths, despite that the compressible layers have a thickness or profile which is greater in the center than at the ends. This can be seen in FIG. 2.

In FIG. 2, the printing blanket 1 is made of composite material. Two fabric layers 2 and 3 are joined together by an adhesive layer 4 to form a substrate. Compressible layer 5 is formed by using a binder, which may be made from a suitable resilient polymer matrix, into which closed cells are evenly introduced to form a compressible composite. Compressible layer 5 is adhered to fabric layer 3 by adhesive layer 6.

As originally adhered to fabric layer 3, compressible layer 5 will generally be of uniform thickness. At this point, however, in accordance with the present invention, compressible layer 5 will be modified in thickness so that it remains thicker towards its center and becomes thinner towards its ends. A convenient means for achieving the desired thickness gradient is to grind or buff the stabilized layer to a parabolic convexity on an O.D. Grinder.

Figure 2A:
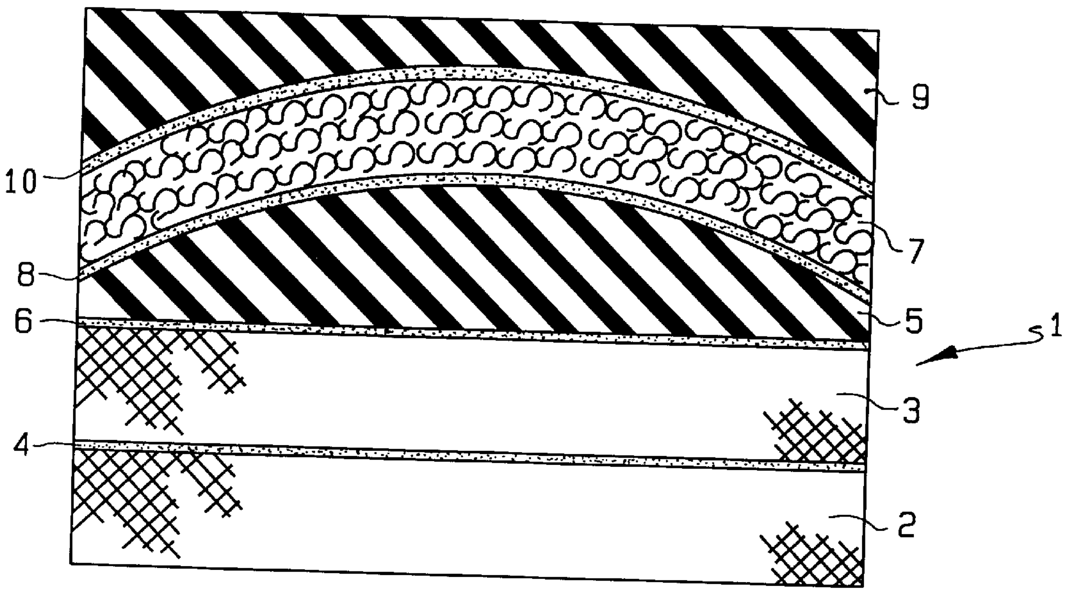
Figure 2B:
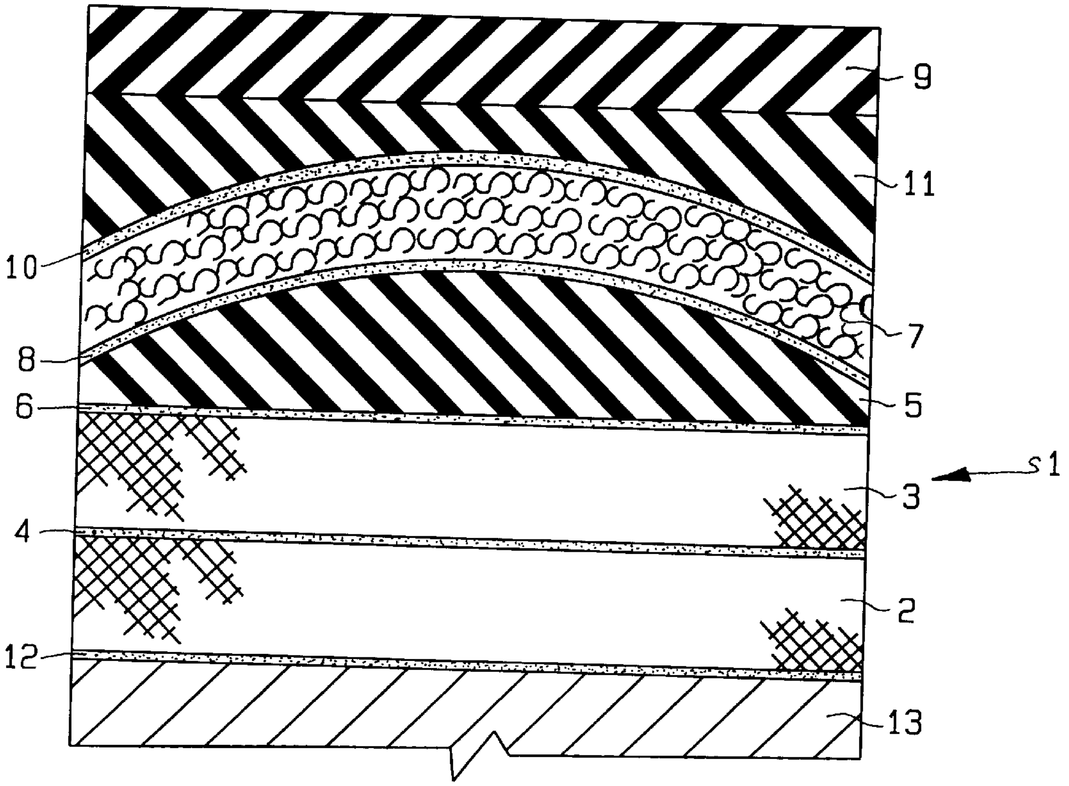

FIG. 2*b* is similar in may respects to the construction shown in FIG. 2*a*. FIG. 2*b*, however, additionally illustrates several features of the present invention not shown in FIG. 2*a*. First, blanket 1 is mounted upon a rotatable metal cylinder 13 adapted to support the blanket. Still further, blanket 1 in FIG. 2*b* is provided with a subface 11 located below printing face 9. Subface 11 is formed of a high durometer, high tensile, low elongation elastomeric compound.

Figure 3A:
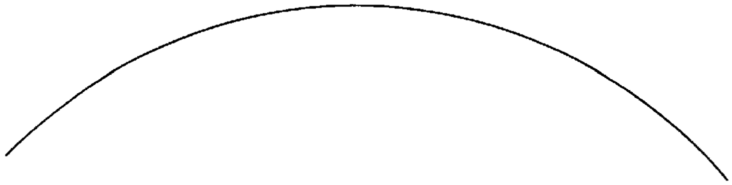
FIGS. 3a–3f are a series of schematically-represented profiles that may be exhibited by the compressible layer within a printing blanket in accordance with the present invention.
Figure 3B:
Figure 3C:
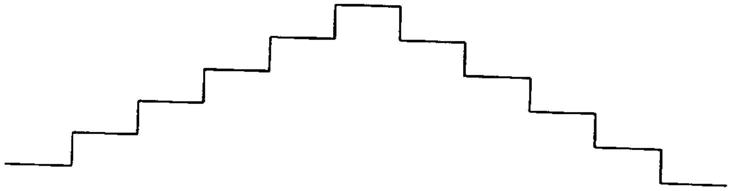
Figure 3D:
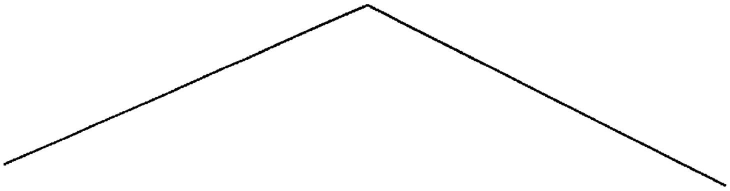
Figure 3E:
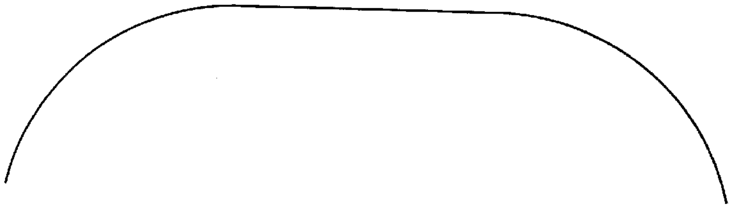
Figure 3F:

While a parabolic convexity will often be used due to the ease of achieving that profile, alternative grinding profiles are contemplated as being within the scope of the present invention. FIG. 3 shows the parabolic profile (FIG. 3*a*), a large central step profile (FIG. 3*b*), a profile consisting of graduated small steps (FIG. 3*c*), a diamond-shaped profile (FIG. 3*d*), a profile in which the ends have been radially ground (FIG. 3*e*), and a profile which has a center step and tapered sides (FIG. 3*f*). The degree of convexity of compressible layer 5 as shown in FIG. 2*a* and in FIG. 3 is exaggerated for illustrative purposes.

Compressible-layer profiles in accordance with the present invention may alternatively be made by means other than grinding a pre-formed conventional layer. The following procedures may be used to achieve the suitable profiles for use in this invention.

For instance, one may vary the thread/dip tank exit hole from small to large to small across the width of the article during the winding of the compressible layer to allow for increasing deposition of the compressible matrix toward the center of the width. Alternatively, one may variably dry the compressible matrix from less dry to more dry to less dry across the width prior to winding of the reinforcing layer to allow for decreasing penetration of the reinforcing threads into the compressible matrix toward the center of the width. One may also vary the reinforcing thread tension from high to low to high across the width to allow for decreasing penetration of the reinforcing threads into the compressible matrix toward the center of the width.

Additionally, one may variably pressurize the compressible layer from high to low to high across the width during stabilization or pre-curing to allow for decreasing density toward the center of the width. One may variably pressurize the completed composite from high to low to high across the width during curing to allow for decreasing density toward the center of the width. One may vary the traverse speed and/or the surface speed of the substrate/cylinder from fast to slow to fast during the winding of the compressible layer to allow for the increased deposition of the compressible matrix toward the center of the width. The precise profile, and the method of implementing it are not critical, so long as the profile results in a compressible layer that is less compressible towards its ends and more compressible towards its center.

Returning to FIGS. 2*a* and 2*b*, once compressible layer 5 has been modified to present thinned edges as described above, a fabric, cord or thread 7 is adhered to compressible layer 5 by adhesive layer 8. The printing surface 9, for instance a solid elastomer such as a nitrile blend, is adhered to fabric layer 7 by adhesive layer 10. As taught by Flint et al., Larson, Shimura, Rhodarmer et al., Pinkston et al., and Burns, cited above, printing surface 9 is often built up directly onto the substructure. There is thus no difficulty in achieving a bottom surface 11 for the printing face that corresponds to the configuration of the top surface of the compressible layer 5.

In accordance with the present invention, however, care should be taken to ensure that the top surface of the printing surface 9 is substantially flat, so that it will be positioned at a substantially uniform radius from the central axis of the roll across its entire width and around its entire circumference. In other words, the exterior surface of the blanket when mounted on a printing cylinder 13 in accordance with the present invention should be substantially cylindrical.

Figure 4:
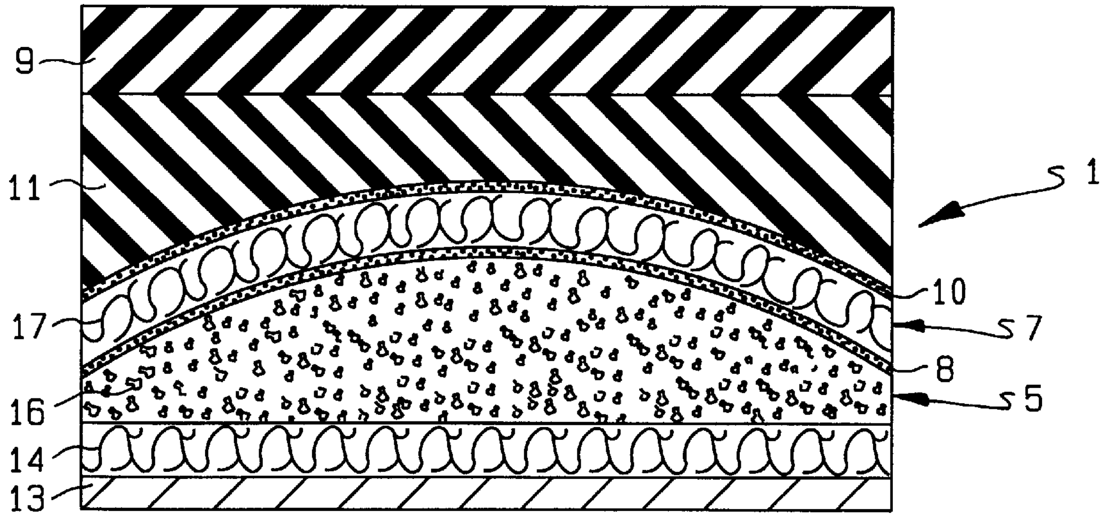
FIGS. 2a–2b and 4 are enlarged sectional views through laminated compressible printing blankets manufactured according to the present invention.

Turning to FIG. 4 there is illustrated a further embodiment of the invention comprising a cylindrical printing blanket 1 produced as follows. Compressible layer 5 is formed by wrapping the support 13 with a thread 14 which is coated with an admixture of an elastomeric matrix and compressible microspheres by passing the thread through a dip tank which contains the elastomeric matrix and microspheres. Due at least in part to the tension applied during the wrapping operation and/or the comparatively greater density of the threads vis a vis that of the matrix and microspheres, the threads 14 applied in the winding sink to the lowermost portion of compressible layer 5 to provide reinforcement to the layer 5. The upper portion of compressible layer 5 thus contains only the elastomeric matrix 15 mixed with cells 16 due to the application which increases the deposition of the matrix and cells toward the center of the laminate. Thereafter, the compressible layer 5 is precured in a manner well-known in the art to set the various components of layer 5 in place.

Subsequently, following the formation of the profiled compressible layer 5, a reinforcing layer 7 is applied thereto by applying a second winding of thread around the compressible layer. Thread 17 used in forming this reinforcing layer (also referred to herein as reinforcing thread) is applied over a layer of adhesive 8 which is applied to the top surface of the compressible layer 5. Due to the pre-curing of compressible layer 5, the reinforcing thread 17 is prevented from sinking down into layer 5 and thus remain atop compressible layer 5. This thread 17 forms the equivalent of an upper fabric ply upon the compressible layer, bound thereto by adhesive 8.

Following the application of reinforcing layer 7, another layer of adhesive 10 is applied. This adhesive layer 10 is used to secure a subface 11 and printing face 9 to the reinforced compressible layer to complete the construction of the blanket shown in FIG. 4.

In addition to printing blankets, the principles of the present invention may be applied also to other similar printing and papermaking machine components such as impression blankets, plate cushions, and support and calendering rollers. In these designs, the present invention provides a compressible cylindrical roll assembly that comprises a metal shaft which is covered by a compressible laminate that has an external surface, for instance an elastomeric printing face, that is of substantially uniform circumference across its width. This compressible laminate includes a compressible layer which has an upper surface the circumference of which is greater in the center of the roll than it is toward both ends of the roll. Thus, the entire roll, rather than a printing blanket, is configured to include the desired compressible layer of the invention.

Although the preferred embodiments of the invention have been specifically described, it is contemplated that changes may be made without departing from the scope or spirit of the invention, and it is desired that the invention be limited only by the appended claims.

What is claimed is:

1. A method of forming a cylindrical printing article having a unitary compressible laminate and which includes a rotatable support in the form of a cylinder, which method comprises forming a compressible laminate having upper and lower surfaces and a substantially uniform thickness from at least a printing face which forms the upper surface and a compressible layer positioned beneath the printing face, said compressible layer containing a plurality of compressible cells dispersed therein and having first and second surfaces, wherein said first surface is bonded to an adjacent surface of said printing face; and forming the first surface of the compressible layer to have a profile with a raised central portion so that said compressible layer is spaced closer to the upper surface of the printing face in the center of the laminate than at the ends.

2. The method of claim 1 which further comprises applying a substantially uniform thickness of the compressible layer and grinding the compressible layer to the desired profile.

3. The method of claim 2 which further comprises grinding the compressible layer to provide a parabolic profile.

4. The method of claim 2 which further comprises grinding the compressible layer to provide a substantially flat central region and outer peripheral portions which radially taper towards the ends of the layer.

5. The method of claim 1 which further comprises applying the compressible layer in the form of threads which carry a matrix of compressible material, and varying the amount of matrix material carried by the threads to increase the deposition of the matrix material toward the center of the laminate.

6. The method of claim 1 which further comprises applying the compressible layer in the form of threads and a matrix of compressible material, and varying the drying rate of the matrix material across the width of the laminate prior to winding of the threads to thus allow for decreasing penetration of the threads into the matrix material toward the center of the laminate.

7. The method of claim 1 which further comprises applying the compressible layer in the form of a matrix of compressible material, and thereafter winding the threads across the width of the laminate while varying the tension to thus allow for decreasing penetration of the threads into the matrix material toward the center of the laminate.

8. The method of claim 1 which further comprises applying the compressible layer in the form of a matrix of compressible material, and thereafter varying the pressure on the compressible layer during pre-curing of the matrix material to allow for decreasing density of the compressible layer toward the center of the laminate.

9. The method of claim 1 which further comprises applying the compressible layer in the form of threads which carry a matrix of compressible material, and varying the speed of the cylinder during the winding of the treads to increase the deposition of the matrix material toward the center of the laminate.

10. The method of claim 1 which further comprises applying the compressible laminate in the form of a printing blanket.

11. The method of claim 10 which further comprises interposing a subface of an elastomeric compound beneath the printing face.

12. The method of claim 10 which further comprises interposing reinforcement comprising threads between the compressible layer and the printing face.

13. The method of claim 1 which further comprises applying the compressible laminate in the form of a printing roller.

14. A method of forming a cylindrical printing blanket which comprises:

providing a cylindrical support; and forming upon said support a unitary compressible laminate having upper and lower surfaces and a substantially uniform thickness from at least a printing face which forms the upper surface and a compressible layer positioned beneath the printing face, said compressible layer containing a plurality of compressible cells dispersed therein and having first and second surfaces, wherein said first surface is bonded to an adjacent surface of said printing face; and forming the first surface of the compressible layer to have a profile with a raised central portion so that said compressible layer is spaced closer to the upper surface of the printing face in the center of the laminate than at the ends.

15. A method of forming a cylindrical printing blanket which comprises:

providing a cylindrical support; and forming upon said support a unitary printing blanket having upper and lower surfaces and a substantially uniform thickness from at least a printing face which forms the upper surface, a subface of an elastomer compound interposed beneath the printing face and a compressible layer positioned beneath the subface, said compressible layer containing a plurality of compressible cells dispersed therein and having first and second surfaces, wherein said first surface is bonded to an adjacent surface of said subface; and forming that first surface of the compressible layer to have a profile with a raised central portion so that said compressible layer is spaced closer to the upper surface of the printing face in the center of the laminate than at the ends.

16. A method of forming a cylindrical printing blanket which comprises:

providing a cylindrical support; and forming upon said support a unitary printing blanket having upper and lower surfaces and a substantially uniform thickness from at least a printing face which forms the upper surface, a plurality of reinforcing threads interposed beneath the printing face and a compressible layer positioned beneath the reinforcing threads, said compressible layer containing a plurality of compressible cells dispersed therein and having first and second surfaces, wherein said first surface is bonded to an adjacent surface of said reinforcing threads; and forming the first surface of the compressible layer to have a profile with a raised central portion so that said compressible layer is spaced closer to the upper surface of the printing face in the center of the laminate than at the ends.

* * * * *